United States Patent
Goetz et al.

(10) Patent No.: US 9,910,680 B2
(45) Date of Patent: Mar. 6, 2018

(54) DECOMPOSING A GENERIC CLASS INTO LAYERS

(71) Applicant: Oracle International Corporation, Redwood City, CA (US)

(72) Inventors: Brian Goetz, Williston, VT (US); John R. Rose, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 109 days.

(21) Appl. No.: 14/660,604

(22) Filed: Mar. 17, 2015

(65) Prior Publication Data

US 2015/0301825 A1 Oct. 22, 2015

Related U.S. Application Data

(60) Provisional application No. 61/982,802, filed on Apr. 22, 2014.

(51) Int. Cl.
*G06F 9/44* (2006.01)
*G06F 9/45* (2006.01)
(Continued)

(52) U.S. Cl.
CPC .............. *G06F 9/4433* (2013.01); *G06F 8/24* (2013.01); *G06F 8/437* (2013.01); *G06F 9/4428* (2013.01);
(Continued)

(58) Field of Classification Search
CPC . G05B 15/02; H04L 29/06; G06F 8/31; G06F 9/4433; G01V 11/00
See application file for complete search history.

(56) References Cited

U.S. PATENT DOCUMENTS 5,628,016 A 5/1997 Kukol
5,677,312 A 10/1997 Kon et al.
(Continued)

FOREIGN PATENT DOCUMENTS

WO 2004102303 11/2004

OTHER PUBLICATIONS

Lembcke et al, "Specialization of Java Generic Types", Dec. 2, 2012, pp. 1-15 <GenericSpecialization_1212.pdf>.*
(Continued)

*Primary Examiner* — Tuan Vu
(74) *Attorney, Agent, or Firm* — Robert C. Kowert; Meyertons, Hood, Kivlin, Kowert & Goetzel, P.C.

(57) ABSTRACT

The domain of genericity of an existing generic class may be expanded to include not just reference types, but also primitive and value types even though some members of the existing class do not support the expanded genericity. A subdivided version of the class may be created that includes a generic layer including abstract versions of class members and a reference-specific layer that including non-abstract versions of class members that are abstract in the generic layer. The subdivided version of the class may also include information that indicates to which layer a class member belongs. Problematic methods (e.g., methods that have built-in assumptions regarding the domain of genericity) may be moved into the second, reference-specific, layer, thereby retaining compatibility with classes that currently instantiate or reference those methods, while still allowing use within the expanded domain of genericity.

20 Claims, 9 Drawing Sheets

(51) Int. Cl.
G06F 9/445 (2018.01)
G06F 9/455 (2018.01)

(52) U.S. Cl.
CPC .............. G06F 8/315 (2013.01); G06F 8/71 (2013.01); G06F 9/443 (2013.01); G06F 9/44521 (2013.01); G06F 9/45516 (2013.01)

(56) References Cited

U.S. PATENT DOCUMENTS

| | | | |
|---|---|---|---|
| 5,923,878 | A | 7/1999 | Marsland |
| 5,966,702 | A * | 10/1999 | Fresko ............... G06F 9/44563 |
| 6,279,008 | B1 | 8/2001 | Tung Ng et al. |
| 6,360,360 | B1 | 3/2002 | Bates et al. |
| 6,513,152 | B1 | 1/2003 | Branson et al. |
| 6,757,890 | B1 | 6/2004 | Wallman |
| 7,000,219 | B2 | 2/2006 | Barrett et al. |
| 7,162,716 | B2 | 1/2007 | Glanville et al. |
| 7,644,402 | B1 * | 1/2010 | Daynes ................ G06F 9/445 717/162 |
| 8,079,023 | B2 | 12/2011 | Chen |
| 8,250,528 | B2 | 8/2012 | Meijer et al. |
| 8,438,551 | B2 | 5/2013 | Tonkin et al. |
| 8,863,079 | B2 | 10/2014 | Darcy |
| 2002/0032900 | A1 | 3/2002 | Charisius et al. |
| 2002/0169785 | A1 * | 11/2002 | Netemeyer ............ G01V 11/00 |
| 2003/0018958 | A1 | 1/2003 | Wallman et al. |
| 2003/0079049 | A1 | 4/2003 | Sokolov |
| 2003/0079201 | A1 | 4/2003 | Sokolov |
| 2003/0174731 | A1 * | 9/2003 | Tafazolli ................ H04L 29/06 370/469 |
| 2004/0006762 | A1 | 1/2004 | Stewart et al. |
| 2004/0221228 | A1 | 11/2004 | Day et al. |
| 2005/0055682 | A1 | 3/2005 | Gadre et al. |
| 2005/0097514 | A1 * | 5/2005 | Nuss ...................... G06F 8/31 717/114 |
| 2005/0149914 | A1 * | 7/2005 | Krapf ................ G06F 9/4428 717/136 |
| 2005/0193269 | A1 | 9/2005 | Haswell et al. |
| 2006/0048024 | A1 | 3/2006 | Lidin et al. |
| 2006/0143597 | A1 | 6/2006 | Alaluf |
| 2006/0206860 | A1 * | 9/2006 | Dardinski ............. G05B 15/02 717/105 |
| 2006/0251125 | A1 | 11/2006 | Goring et al. |
| 2007/0256069 | A1 | 11/2007 | Blackman et al. |
| 2008/0033968 | A1 | 2/2008 | Quan et al. |
| 2008/0040360 | A1 | 2/2008 | Meijer et al. |
| 2008/0257910 | A1 | 10/2008 | Chang |
| 2008/0294740 | A1 | 11/2008 | Grabarnik et al. |
| 2009/0271771 | A1 | 10/2009 | Fallows |
| 2010/0223606 | A1 | 9/2010 | Park et al. |
| 2011/0067013 | A1 | 3/2011 | Frost et al. |
| 2012/0005660 | A1 | 1/2012 | Goetz et al. |
| 2013/0305230 | A1 | 11/2013 | Inoue |

OTHER PUBLICATIONS

"Generics in the Java Programming Language"—Gilad Bracha, Sun Microsystems, Inc.—Jul. 5, 2004.
Nystrom et al., "Genericity through Constrained Types", 2009, IBM Watson Research Center, 18 pages.
Shailendra Chauhan, "Difference Between Generalization and Specialization", 2013, retrieved from http://www.dotnet-tricks.com/Tutorial/oops/169c211013-Difference-Between-Generalization-and-Specialization.html, 6 pages.
Kiezun et al., "Refactoring for Parameterizing Java Classes", IEEE, 2007, pp. 1-10.
Ernst, "Inheritance versus Parameterization", ACM, 2013, pp. 26-29.
Sunil Soman, et al., "Efficient and General On-Stack Replacement for Aggressive Program Specialization", 2006 International Conference on Programming Languages and Compilers (PLC'06), Jun. 26-29, pp. 1-9, Las Vegas, NV.
International Search Report and Written Opinion from PCT/US2015/026966, dated Sep. 1, 2015, Oracle International Corporation, pp. 1-11.
Martin J. Cole, et al., "Dynamic compilation of C++ template code", Scientific Programming vol. 11, No. 4, Jan. 1, 2003, pp. 321-327.
Eyvind W. Axelsen, et al., "Groovy Package Templates", Proceeding of the 5th Symposium on Dynamic Languages, Oct. 26, 2009, pp. 15-26.
Lubomir Bourdev, et al., "Efficient run-time dispatching in generic programming with minimal code bloat", Science of Computer Programming, vol. 76, No. 4, Apr. 1, 2011, pp. 243-257.
Brian Goetz, "ClassDynamic Jun. 2014: Initial Draft", Retrieved from the Internet: URL: http://web.archive.org/web/20140801102025/http://cr.openjdk.java.net/briangoetz/valhalla/spec-classdyn.html, Jun. 2014, pp. 1-3.
International Search Report and Written Opinion from PCT/US2015/026947, dated Jul. 6, 2015, Oracle International Corporation, pp. 1-11.
Eric Allen, et al., "Efficient Implementation of Run-Time Generic Types for Java", Mar. 3, 2006, Retrieved from the Internet: URL: http://web.archive.org/web/20060303102205/http://www.cs.rice.edu/javaplt/paper/wcgp2002.pdf, pp. 1-28.
Robert Cartwright, et al., "Compatible Genericity with Run-Time Types for the Java Programming Language", Principles of Programming Languages, ACM, Oct. 1, 1998, pp. 201-215.
Joseph A. Bank, et al., "Parameterized Types and Java", May 1996, Retrieved from the Internet: URL: http://publications.csail.mit.edu/lcs/pubs/pdf/MIT-LCS-TM-553.pdf, pp. 1-19.
"Design Pattern Instantiation Directed by Concretization and Specializaion"—Peter Kajsa—ComSIS vol. 8, No. 1, Jan. 2011 (DOI:10.2298/CSIS091212032K), pp. 1-32.
"Common Language Infrastructure (CLI) Partitions I to VI," 6th Edition / Jun. 2012, ECMA International, Standard ECMA-335, pp. 1-574.
Michael Johnson, "New Features of C#", CSCI 5448, 2012, p. 5.
Alessandra Warth, et al., "Statically Scoped Object Adaptation with Expanders", ACM OOPSLA'06, Oct. 22-26, 2006, pp. 1-19.
International Search Report and Written Opinion in PCT/US2015/026962, dated Jul. 2, 2015, Oracle International Corporation, pp. 1-12.
Andrew Myers, et al., "Parameterized Types for Java", Conference Record of POPL '97: 24th ACM SIGPLANSIGACT Symposium on Principles of Programming Language, Jan. 15-17, 1997, pp. 132-145.
Atanas Radenski, et al., "The Java 5 Gererics Comprise Orthogonality to Keep Compatibility", Journal of Systems & Software, Nov. 1, 2008, pp. 2069-2078, vol. 81, No. 11.
Brian Goetz, "State of the Specialization", Retrieved from the Internet: http://web.archive.org/web/20140717190322/http://cr.openjdk.java.net/briangoetz/valhalla/specialization.html, pp. 1-7.
"Templates, C++ FAQ", Jan. 15, 2014, Retrieved from the Internet: URL:http://web.archive.org/web/20140115082944/http://isoccp.org.wiki/faq/templates, pp. 2-27.
U.S. Appl. No. 14/660,143, filed Mar. 17, 2015, Brian Goetz et al.
U.S. Appl. No. 14/660,177, filed Mar. 17, 2015, Brian Goetz et al.
U.S. Appl. No. 14/692,590, filed Apr. 21, 2015, Brian Goetz et al.
U.S. Appl. No. 14/692,592, filed Apr. 21, 2015, Brian Goetz et al.
U.S. Appl. No. 14/692,593, filed Apr. 21, 2015, Brian Goetz et al.
U.S. Appl. No. 14/692,601, filed Apr. 21, 2015, Brian Goetz et al.
International Search Report and Written Opinion from PCT/US2015/026965, Oracle International Corporation, dated Nov. 6, 2015, pp. 1-11.
Gamma E et al: "Design Patterns: Elements of Reusable Object-Oriented Software", Sep. 1, 1999, pp. 81-228, XP882287989, p. 175-p. 184.
Iulian Dragos et al: "Compiling generics through user-directed type specialization", Proceedings of the 4th Workshop on the Implementation, Compilation, Optimization of Object-Oriented Languages and Programming Systems, ICOOOLPS '09, Jul. 6, 2009 (Jul. 6, 2009), pp. 42-47, XP055195664, New York, New York, USA DOI: 10.1145/1565824.1565830, ISBN: 978-1-60-558541-3, p. 43-p. 46.
Martin Buchi et al: "Generic Wrappers" In: "Advances in Communication Networking: 20th EUNICE/IFIP EG 6.2, 6.6 International

(56) References Cited

OTHER PUBLICATIONS

Workshop, Rennes, France, Sep. 1-5, 2014, Revised Selected Papers", May 12, 2000 (May 12, 2000), Springer Verlag, DE 032548, XP055223226, ISSN: 0302-9743, ISBN: 978-3-642-36699-4, vol. 1850, pp. 201-225, DOI: 10.1007/3-540-45102-1 10, p. 202-p. 219.
Evered M et al: "Genja—a new proposal for parameterised types in Java", Technology of Object-Oriented Languages and Systems, 1997. Tools 25, Proceedings Melbourne, VIC., Australia Nov. 24-28, 1997, Los Alamitos, CA, USA,IEEE Comput. Soc, US, Nov. 24, 1997 (Nov. 24, 1997), pp. 181-193, XP010286322, ISBN: 978-0-8186-8485-2 p. 182-p. 188.

* cited by examiner

DECOMPOSING A GENERIC CLASS INTO LAYERS

PRIORITY INFORMATION

This application claims benefit of priority to the following provisional application, which is hereby incorporated by reference in its entirety: Ser. No. 61/982,802 filed Apr. 22, 2014 titled Specializing Parametric Types with Primitive Type Arguments.

BACKGROUND

The present invention relates generally to software development and more specifically to various aspects of language development within any of various programming languages, such as a platform-independent, object-oriented programming language, as one example.

Many programming languages support parametric polymorphism, such as generic classes in Java, C# and Scala. Generic classes are often written with assumptions about the domain of genericity. Frequently such assumptions are explicit within the programming language, while other assumptions are implicit. For example, within the Java programming language generic classes have traditionally been written assuming that type variables range over reference types only. These assumptions are often integral to the implementation of these classes. For instance, for a generic class with the declaration, List<T>, developers may write code with the assumption T must be a reference type. However, the assumptions about the restricted domain make the ability to generify over a broader domain, such as one including both reference and primitive types, more difficult or problematic.

SUMMARY

Described herein are various embodiments of enhancements to object oriented software development to include language and/or runtime support for performing decompositions on generic classes to support expansion of their genericity to larger domains while preserving compatibility (e.g., binary, source and/or behavioral compatibility) with existing implementations and clients.

The techniques described herein may involve "peeling" a generic class into multiple layers. For example, a generic class may be "peeled" to include one fully generic layer which may be considered generic over the expanded domain, and another layer which may be restricted to the previous domain (e.g., reference-specific as one example). Problematic methods (e.g., methods that have built-in assumptions regarding the domain of genericity) may be moved into the layer corresponding to the previous (e.g., more restrictive) domain of genericity, thereby retaining compatibility with classes that currently instantiate or reference those methods, while still allowing use within the expanded domain of genericity.

The domain of genericity of an existing generic type may be compatibly expanded by allowing the creation of a subdivided version of the class that includes multiple layers, such as a fully generic layer that supports the expanded domain as well as other layers that may not fully support the expanded domain of genericity. For example, the Java programming language may be enhanced to allow the creation of subdivided generic classes that include a fully generic layer supporting types other than reference types and a layer that supports the previous (e.g., reference only) domain of genericity.

The subdivided version of the class may also include information that indicates in which layer a particular class member resides. In some embodiments, a single subdivided generic class may be loaded, instantiated and/or specialized for types corresponding to both the expanded genericity domain (e.g., reference types, primitive types, values types, tuple types, etc.) and types that correspond to the previous domain of genericity (e.g., only reference types in a Java example).

Thus, utilizing generic classes with multiple layers may allow the expansion of the domain of genericity to include additional types (e.g., not just all reference types, but also primitive type and/or all value types) while preserving compatibility with existing implementations and clients, according to some embodiments.

DETAILED DESCRIPTION OF EMBODIMENTS

Figure 1:
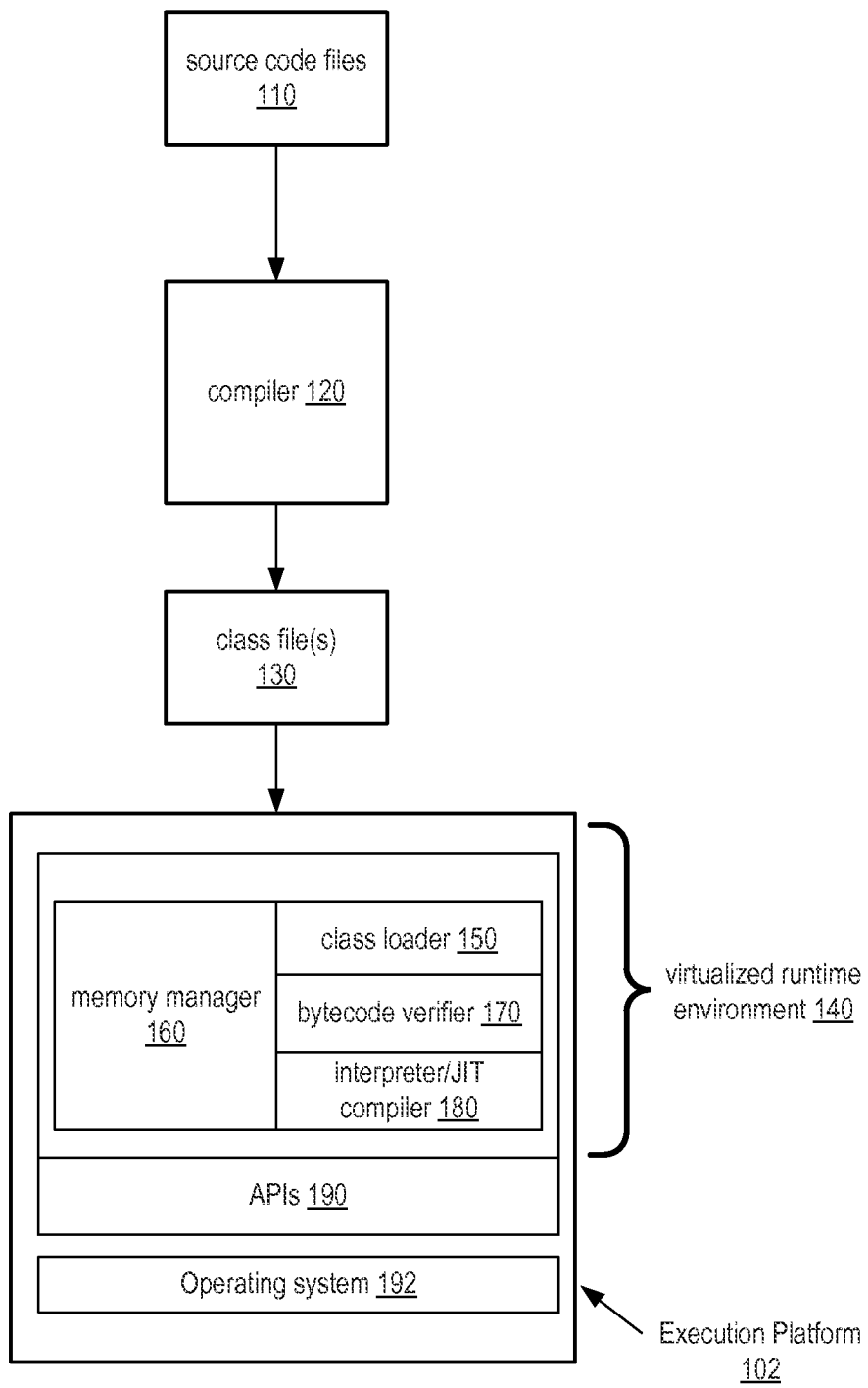
FIG. 1 is a logical block diagram illustrating a workflow for compiling and executing a computer program specified in a high-level object-oriented and that is configured to support decomposing a generic class into layers, according to various embodiments.

Described herein are various embodiments of enhancements to software development using an object oriented language, such as enhancements to the Java™ programming language, to support performing a decomposition on generic classes to support binary, source and/or behavioral compatibility with existing implementations and clients while still supporting expansion of its genericity to a larger domain. A domain of genericity may refer to the range of different types supported by a generic class, according to some embodiment.

Is some embodiments, the decomposition of generic classes into two or more layers may be referred to as "peeling". For example, a generic class may be "peeled" into multiple layers, such as one generic layer which may be considered generic over the expanded domain (e.g., fully generic), and one layer which may be restricted to the previous domain (e.g., reference-specific). Problematic methods (e.g., methods that have built-in assumptions regarding the domain of genericity) may be moved into the second, reference-specific, layer, thereby retaining compatibility with classes that currently instantiate or reference those methods, while still allowing use within the expanded domain of genericity.

For instance, in some embodiments, a programming language may be enhanced to compatibly expand the domain of genericity of an existing generic type by supporting the creation of subdivided versions of classes that include multiple layers. For example, in one embodiment, a class may be subdivided into a generic layer for abstract versions of one or more class members and an object (or reference-specific) layer for non-abstract versions of members that are abstract in the generic layer. A subdivided version of a class may include information that indicates in which layer a particular member resides. Additionally, a runtime environment may load, instantiate and/or specialize a subdivided generic class. In some embodiments, the same subdivided generic class may be loaded, instantiated and/or specialized for both reference and not-reference types.

Thus, according to some embodiments, peeling generic classes into multiple layers may allow the expansion of the domain of genericity to include not just all reference types, but also primitive type and/or all value types while preserving compatibility with existing implementations and clients. For example, within the Java programming language, use of peeling, as described herein, may allow a generic class List<T> to be specialized with T being a reference type, a primitive type and/or a value type, in one embodiment. In another embodiment, within a tripartite system that supports classes, functions and tuples (such as the Fortress™ system) a class may be subdivided into multiple layers to support varying levels of genericity. For example, a subdivided class may include layers for classes, functions and/or tuples, as well as more fine grained layers, such as to support specific cases (e.g., int, numeric, "T extends Comparable", etc.).

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The methods and/or features described herein may involve various aspects of language development, such as (for example) including base support for describing dynamically derived classes in a Java Virtual Machine (JVM), translation mechanisms in the Java compiler for translating language-level concepts into bytecode that the JVM can execute, and features exposed in the Java language for expressing things that could not previously be expressed, according to various embodiments. Various embodiments of the methods, techniques, features and/or enhancements described herein are discussed in terms of the Java programming language and/or using features of software development using the Java programming language. However, the methods, techniques, features and other enhancements described herein may also be used with other programming languages, such as C, C++, C#, Scala®, Python, according to various embodiments.

Additionally, a class, as referred to herein, may be considered a user-defined type or data structure that may include data, variables, functions, methods and/or other attributes as members and that represents a definition, blueprint, or template, for creating programming objects of a specific type. A class may provide initial values for data members and implementations for member functions and methods. Classes are frequently included in libraries. A library, as referred to herein, may be considered a collection of resources used by software programs or applications. A library may include any of various types of resources including, but not limited to, data, documentation, classes, subroutines, and/or type specifications, according to some embodiments. A library may be organized so as to be utilized by more than one application (possibly at the same time), and may promote re-usability by providing resources so that applications may not have to implement (or re-implement) the same behavior.

Turning now to FIG. 1 which illustrates a workflow for compiling and executing a computer program specified in a high-level, platform independent, object-oriented language that supports primitive and reference data types, and various methods, features and enhancements regarding decomposing generic classes into layers as described herein, according to various embodiments. For purposes of illustration, the following description is provided largely in the context of using the Java™ programming language. However, it is noted that the techniques described may be used with virtually any programming language that supports primitive and reference types and specialization in any appropriate context.

According to the illustrated embodiment, the workflow may begin when a compiler, such as compiler 120, receives source code for a computer program, such as source code files 110. In various embodiments, source code files 110 may be specified in various high-level and/or platform independent, object-oriented programming languages, such as Java™ and/or other languages. For example, source code may be provided as a set of .java files in embodiments where Java™ is being used. Similarly, source code may be provided as a set of .cpp files in embodiments where C++ is being used. In some embodiments, source code files 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

The compiler 120 may analyze the source code files 110 to produce an executable version of the program or bytecode files, such as class file(s) 130 (e.g., .class files or .jar files in the case of Java™) in the depicted embodiment. Different types of executable code formats may be used in various embodiments; for example, binary machine language may be used instead of bytecodes. In some scenarios, parts of the executable code in class file(s) 130 may be in bytecode while others are in a native binary machine language.

As part of compiling program source code files 110 into class file(s) 130, the compiler 120 may perform a sequence of analysis operations and generate various intermediate data structures before generating the executable version, such as to apply or implement decomposing generic classes into layers, according to some embodiments. For example, the compiler may generate one or more subdivided classes (e.g., classes that have been peeled into multiple layers) when creating class file(s) 130. As noted above, programming language may be modified to allow a generic class to be compatibly decomposed (or "peeled") into multiple layers, one which is generic over the expanded domain (e.g., fully generic), and one which is restricted to the previous domain (e.g., reference-specific). Thus, a compiler 120 may be modified to support an expanded domain of genericity by implementing various programming language features allowing a developer to create new classes (or modify existing classes) that include multiple genericity layers while preserving compatibility with existing implementations, as will be discussed in more detail below.

As illustrated in FIG. 1, class file(s) 130 may be passed to an execution environment, such as virtualized runtime environment 140, which executes the code on an execution platform 102, thereby creating various output data and/or behavior. The virtualized runtime environment 140 may in turn comprise a number of different components, such as a class loader 150, a memory manager 160, a bytecode verifier 170 (e.g., to check the validity of the executable code), and/or an interpreter and/or a just-in-time (JIT) compiler 180, according to various embodiments. The JIT compiler may in some embodiments be responsible for translating some or all of the bytecode (for example, heavily-used portions of bytecode) into platform-specific machine code to improve performance of the program execution. A virtualized runtime environment 140 may also include code to implement a number of application programming interface (API) libraries 190 in some embodiments. The virtualized runtime environment 140 may run on top of lower-level software such as an operating system 192 in some embodiments.

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

Parametric polymorphism within an object-oriented programming involves generic types, methods and classes. For example, within the Java™ Programming language, a generic type is a generic class or interface that is parameterized by a set of type parameters. Traditionally, a generic class is defined with a type parameter section, delimited by angle brackets (< >), following the class name. The parameter section specifies the type parameters (also called type variables). To update a non-generic class to use generics, a generic type declaration may be created by introducing the type variable, T, that can be used anywhere inside the class. One, some, or all occurrences of Object (e.g., depending on the particular situation) within the class declaration may be replaced by T. Similarly, a generic method may also parameterized by a set of type parameters. Traditionally, a type variable can be any non-primitive type (e.g., any class type, any interface type, any array type, or even another type variable). However, by applying the methods and/or techniques described herein, the domain of genericity may be expanded to include additional types (e.g., primitive types, value types, function types, tuple types, etc.) while preserving compatibility with existing implementations.

As noted above, generic classes are often written with assumptions about the domain of genericity. However, as described herein according to various embodiments, that limitation may be lifted to allow a generic type parameter to range over the unbounded set of all types, or over a bounded set of types which includes at least one type which was not in the previous domain of genericity (e.g., that is not a reference in a Java based example—such as int). Lifting this limitation may, in some embodiments, require the retrofitting of existing types which have made explicit assumptions about their domain of genericity by extracting (e.g., layering and/or refactoring) the structures (e.g., class members) which apply to all type parameter assignments (such as int or float as well as Object or String), while leaving behind those structures which are limited to working only on references (such as Object or String).

According to some embodiments, a decomposition may be performed on generic classes to support compatibility with existing implementations and clients while still supporting expansion of its genericity to a larger domain. This technique may be referred to herein as "peeling" because it may take a generic class and peel it into multiple layers (e.g., one which is generic over the expanded domain and one (or more) which is restricted to the previous domain). Thus, in some embodiments, problematic methods may be moved into a different layer, thereby retaining compatibility with classes that currently instantiate or reference them, while still allowing use with the expanded domain of genericity.

In some embodiments, some classes may not need to be subdivided because they may not include (e.g., were developed with) assumptions regarding a more limited domain of genericity. In other words, some classes may already support a broader genericity domain. However, other classes may have assumptions regarding a limited domain of genericity and therefore may require extensive modifications (e.g., subdividing) to support an expanded domain of genericity. In yet other embodiments, classes may be developed such that most functionality with the class may be included in any of the subdivided layers, but certain methods may be included (e.g., "jailed") in a reference layer, while possibly including new generic methods to provide the same functionality in one or more other layers within the subdivided class.

Thus, in some embodiments, compiler 120 may be configured to support the expanded domain of genericity of an existing generic type by allowing the creation of a subdivided version of the class that supports the expanded genericity yet also preserves the compatibility (e.g., source compatibility, binary compatibility, and/or behavioral compatibility) of the existing generic class. In various embodiments, there may be more than one type of compatibility, such as source compatibility, binary compatibility and/or behavioral compatibility. Source compatibility may allow source files that reference a modified class to continue to be compiled after changes have been made. Binary compatibility may allow binary files linking to the modified class to continue to properly link after changes have been made. Behavioral compatibility may allow functionality that was offered before modifying a class to be the same as the functionality that was offered after modifying the class.

As will be explained more detail below, the subdivided version of the class may include a generic layer that includes versions of one or more class members and a layer corresponding to the previous domain of genericity supported by the class that may include other versions of members that are in the generic layer, according to some embodiments. In one embodiment, compiler 120 may include, in the subdivided version of the class, information (e.g., adornments, attributes, metadata, etc.) that indicates members that support the expanded genericity (e.g., that are in the generic layer) and members that do not support at least part of the expanded genericity (e.g., that are in the object layer).

In some embodiments, virtualized runtime environment 140 may be configured to load, instantiate and/or specialize subdivided (e.g., multi-layer or peeled) generic classes. For example, in some embodiment virtualized runtime environment 140 may be configured to load and/or instantiate a fully generic version (e.g., a version of the generic class instantiated for a non-reference type) of a subdivided generic class. Similarly, in another embodiment, virtualized runtime environment 140 may be configured to load and/or instantiate a version of the same subdivided generic class that corresponds to the previous genericity domain (e.g., a version of the generic class instantiated for a reference type). Thus, according to various embodiments, virtualized runtime environment 140 may be configured to load and/or instantiate both fully generic and less than fully generic versions of a subdivided generic class.

Additionally, in some embodiments, virtualized runtime environment 140 may be configured to specialize a subdivided generic class for various parameterizations. For example, in one embodiment, virtualized runtime environment 140 may be configured to specialize a single subdivided generic class for reference types, primitive types, value types and/or for virtually any type.

Peeling (e.g., decomposing a generic class into multiple layers) may, as one example, involve introducing two layers to a generic class: a fully generic one and one corresponding to the previous domain of genericity (e.g., a reference-specific layer specific to instantiation with T extends Object), thereby expanding the domain of genericity for the class while preserving compatibility with existing implementations, as in some embodiments. Peeling may be considered a technique for compatibly rewriting library classes that have incomplete or inconsistent generics. For example, traditionally generic classes where written using the Java programming language with the assumption that they would only ever apply to reference types.

In some embodiments, decomposing generic classes into multiple layers (e.g., peeling) may include compatibly expanding the domain of genericity of an existing generic class even though one or more members of the class do not support at least part of the expanded genericity. The one or more members of the class may include one or more of a method, a field, a constructor and/or a nested type. A subdivided version of the class may be created that encompasses all members of the class in one or more of the layers.

Figure 2:
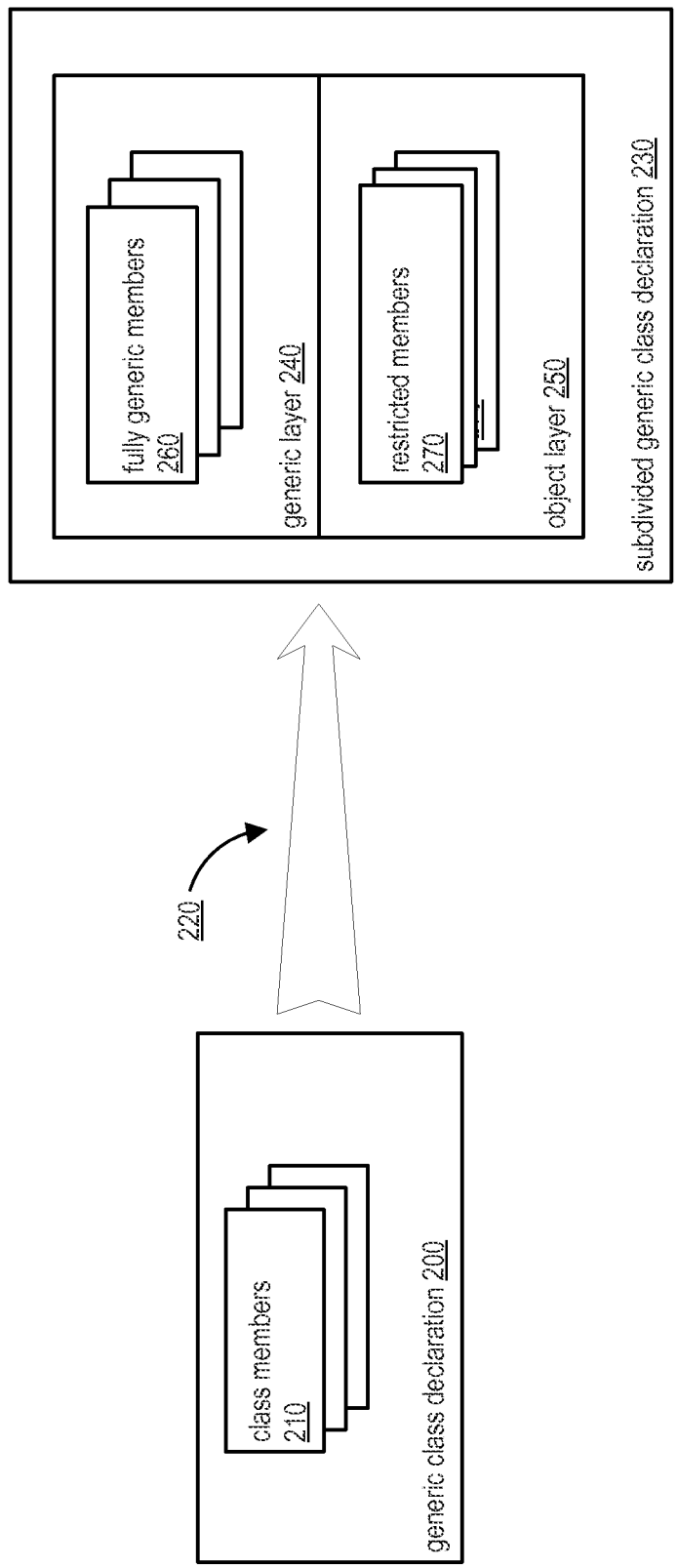
FIG. 2 is a logical block diagram illustrating the creation of a subdivided generic class that includes multiple layers, according to one embodiment.

FIG. 2 is a logical block diagram illustrating the creation of a subdivided generic class that includes multiple layers, according to one embodiment. As shown in FIG. 2, the existing generic class declaration 200 may include one or more class members 210. In order to compatibly expand the domain of genericity for the generic class, as indicated by the arrow 220, a subdivided generic class declaration 230 may be generated. For example, in one embodiment, the existing class declaration 200 may have been written with the assumption of a reference only domain, such as with the assumption that variable types (for generic classes) only range over reference types. In order to expand the domain of genericity from a reference only domain to a larger domain (e.g., reference types as well as value types), the existing generic class declaration 200 may be rewritten to produce the subdivided generic class declaration 230. As noted above, a subdivided class may include multiple layers. The subdivided generic class declaration 230 has been subdivided or "peeled" to include both a generic layer 240 and an object layer 250 that corresponds to the previous domain of genericity (e.g., reference only), according to the embodiment illustrated by FIG. 2.

The following example pseudocode may represent an existing generic class declaration 200, according to one embodiment:

```
class Foo<T> {
    void foo(T t) {
    }
}
```

In the example code above, the method void foo(T t) may have been written with assumptions about the domain of genericity and therefore may not support an expanded domain of genericity. Thus, the example class above may be decomposed or peeled into a subdivided generic class, such as represented by subdivided generic class declaration 230, as in in the following example pseudocode:

```
class Foo<expanded T> {
    void newMethodGenericInExpandedT( ) { ... }
    layer (reference T) {
        void foo(T t) { ... }
    }
}
```

The existing methods whose interfaces and/or implementations that are not suitable (e.g., do not support) the expanded domain of genericity may be put into a layer that is restricted to the previous domain. For instance, in the above example, the method foo(T t) has been moved into a reference-specific layer. As illustrated in the example above, the different layers of a class may be indicated using a "layer" keyword, according to some embodiments. In other embodiments however, the layers of a class may be indicated in different manners. For instance, the above example could be written using different syntax to indicate the reference-specific layer:

```
class Foo<expanded T> {
    void newMethodGenericInExpandedT( ) { ... }
    <where T extends Object>
    void foo(T t) { ... }
}
```

Thus, as will be explained in more detail below, the individual layers within a decomposed (e.g., peeled) class may be indicated using different mechanisms in different embodiments.

The generic layer 240 may include fully generic class members 260, which may be usable when instantiating (or specializing) the generic class for types of the expanded domain of genericity (e.g., types other than just reference types). The object layer 250 may, in one example embodiment, be a reference-specific layer that includes restricted method members 270, which may be restricted to instantiations (or specializations) for the generic class for reference types. While subdivided generic class declaration 230 illustrated in FIG. 2 includes two layers (e.g., the generic layer and the object layer), in other embodiments, subdivided classes may include more than two layers to support different domains of genericity (e.g., reference types, primitive types, value types, function types, tuple types, etc.). Additionally, different layers within a subdivided generic class may include different class members, such as different methods. For instance, generic layer 240 may include abstract versions of one or more of the class members, while object layer 250 may include non-abstract versions of at least some of the class members that are abstract in generic layer 240, according to some embodiments.

Thus, in some embodiments, a programming language may be enhanced to expand the domain of genericity allowing the creation of subdivided versions of classes that support the expanded genericity while preserving compatibility (e.g., source compatibility, binary compatibility, and/or behavioral compatibility) with the existing generic class. In one embodiment, a subdivided version of a class information (e.g., adornments, attributes, metadata, etc.) that indicates members that support the expanded genericity (e.g., that are in fully generic layer) and members that do not support at least part of the expanded genericity (e.g., that are in a layer corresponding to the previous domain of genericity).

Figure 3:
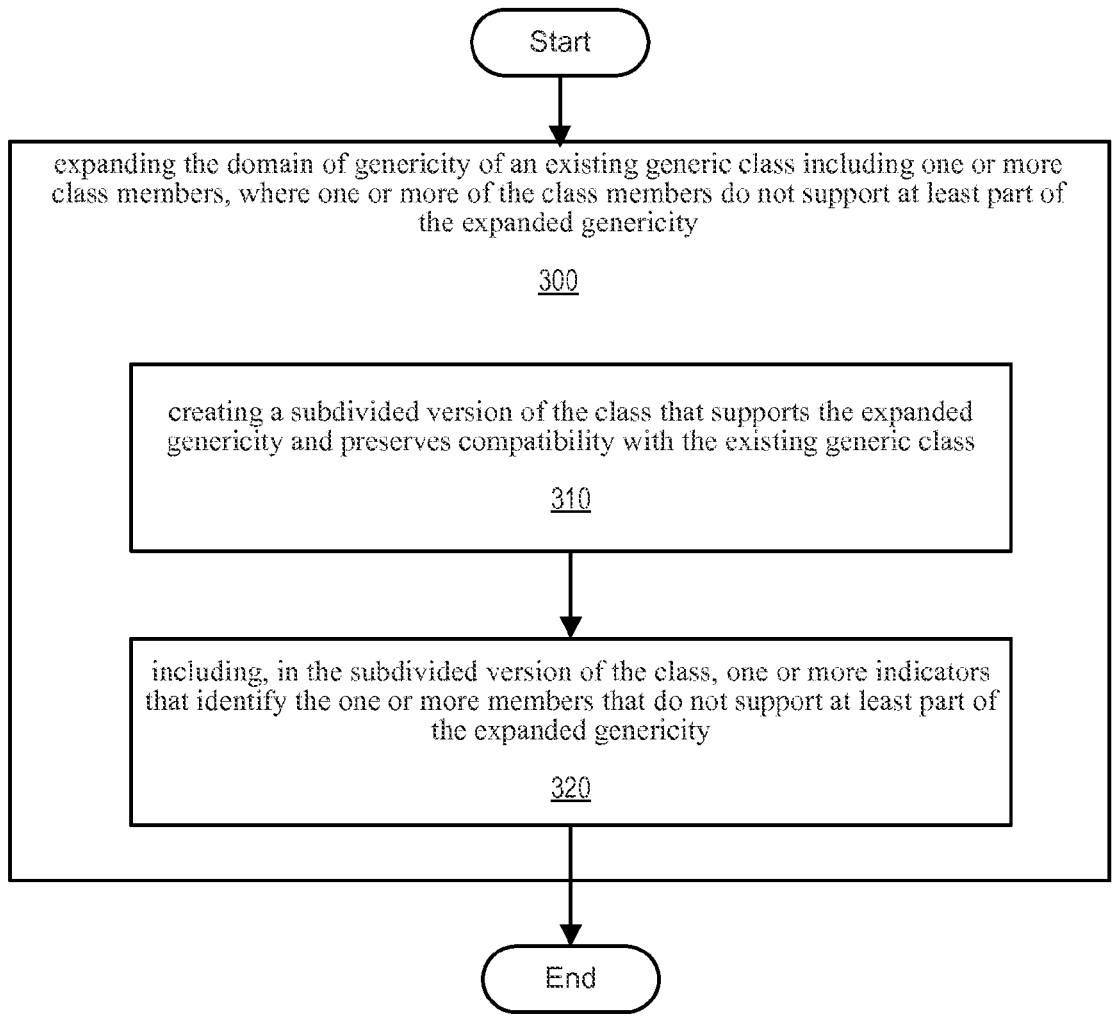
FIG. 3 is a flowchart illustrating one embodiment of a method for creating a subdivided class that includes both a fully generic layer and a reference-specific layer, according to one embodiment.

FIG. 3 is a flowchart illustrating one embodiment of a method for creating a subdivided class that includes both a fully generic layer and a reference-specific layer, according to one embodiment. As illustrated in block 300, the domain of genericity of an existing generic class that includes one or more class members may be compatibly expanded, even though one or more of the class members do not support at least part of the expanded genericity, according to some embodiments. For example, as described above, an existing class declaration 200 may include one or more class members 210, at least one of which may not support the expanded genericity. For instance, existing class declaration 200 may have been written with the assumption that the class will only ever be generic over reference types, and therefore at least one class member may not support expanding the domain of genericity to include primitive (or other non-reference) types.

Expanding the domain of genericity of an existing class may include, as shown in block 310, creating a subdivided version of the class that supports the expanded genericity and preserves compatibility with the existing generic class and may also involve including, in the subdivided version of the class, one or more indicators that identify the one or more members that do not support at least part of the expanded genericity, as shown in block 320, according to various embodiments. For example, subdivided generic class declaration 230 may be generated and may include various indicators that identify the fully generic members 260 of the class and/or identify the restricted members 270 of the class. As will be explained in more detail below regarding FIG. 4, subdivided generic class declaration 230 may include any of various types of indicators, according to different embodiments.

Thus, the different layers may be adequately distinguished, on a member-by-member basis, according to some embodiments. Additionally, various layers may also be properly related by a sub/super relationship, which may, in some embodiments, require detailed rules for inheriting super-type members into the sub-type layer. In some embodiments, this relationship may allow multiple tiers of software reuse.

For instance, newly written programs which support the expanded domain of genericity may reuse the generic layer 240 (e.g., the expanded or super-type layer), while exiting programs (or code bases) which can live with the previous domain of genericity (e.g., a reference-only limitation) may use the object layer 250 (e.g., the restricted or sub-type layer), and thus may not require modification. For example, a generic class ArrayList<T> may, in some embodiments, be used with primitive types, such as int, as well as with reference types, such as String. When using peeling, as described herein, the domain of genericity for a generic class, such as ArrayList, may be expanded to include primitive and/or value types without having to re-write existing code (e.g., class, applications, libraries, etc.) that uses ArrayList with the assumption that the generic class ArrayList may only be used with (e.g., instantiated or specialized with) reference types.

According to some embodiments, backward compatibility may be provided by making the layer that corresponds to the previous domain of genericity (e.g., the object or restricted layer) functionally identical with the traditional, existing type of generic class. Additional applications of layering/factoring may also provide other benefits, such as specialized implementations for types in both the old (limited bounds) and new (unlimited) systems, according to various embodiments.

Furthermore, in some embodiments, classes may include one or more layers that are type specific, as shown in the following example pseudocode:

```
class List<any T> {
    /* regular list methods */
    <where T extends int>
    int sum( ) { /* compute sum of elements */
}
```

A subdivided version of a class may also include instructions for special treatment of class members that do not support at least part of the expanded genericity and the special treatment of the class members may preserve compatibility (e.g., source compatibility, binary compatibility, and/or behavioral compatibility) with existing uses of the class. In some embodiments, the instructions for special treatment may be triggered at least in part by a static or dynamic type of an input to an overloaded method of the class, for example.

Figure 4:
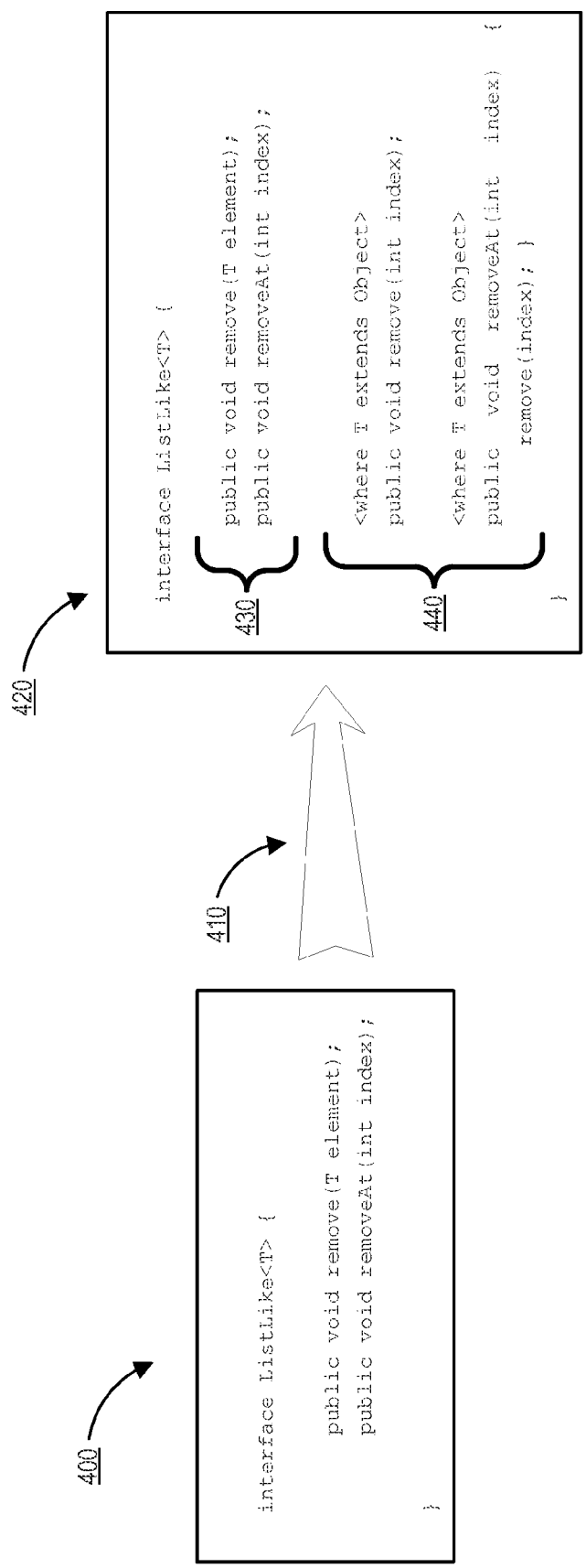
FIG. 4 is a logical block diagram illustrating one example of a generic class that includes both a fully generic layer and a reference-specific layer, according to one embodiment.

FIG. 4 is a logical diagram illustrating one example of a generic class with multiple layers, according to one embodiment. As shown in FIG. 4, a compiler 120 may be configured to support the generation (as indicated by the arrow 410) of subdivided generic class 420 from the existing generic class 400. For example, a generic class 400, such as ListLike<T>, may in some embodiments be logically divided or "peeled" into two layers—a generic layer 430 and a reference-specific or object layer 440. The generic layer 430 may be generic over the expanded genericity while the object layer 440 may be specific to the previous domain of genericity (e.g., reference instantiations in the embodiment illustrated by FIG. 4) of a type variable, thus preserving compatibility with existing implementations and clients.

Utilizing multiple layers with a class may, in some embodiments, enable potential conflicts between primitive and reference types, such as between replace(int) and replace(T) to be handled within specialization. Existing generic classes may have compatibility issues when migrating them to reified, expanded, or specialized generics. For instance, certain overloadings that have been traditionally valid may become problematic under specialization using an expanded domain of genericity. For example, the following example code:

```
interface ListLike<T> {
    void remove(T element);
    void remove(int index);
}
``` is perfectly fine with the assumption that T represents a reference type, but when generics are extended so that T may take on a value or primitive type (e.g., int), this may become problematic as there may no way to distinguish the two remove methods. With a body of code that depends on ListLike<T> for reference T, neither of the remove methods in the above example may be removed or renamed without breaking compatibility. However, these methods may need to be resolved both on the specialization side (e.g., what methods to generate) and on the overload selection (e.g., which method to invoke). In other words, layering information may be consumed (e.g., utilized) both when generating specialized code and when compiling client code, according to some embodiments.

For example, consider the overload pair in the List-like class example used above:

```
interface ListLike<T> {
    void remove(T element);
    void remove(int index);
}
```

Traditional (e.g., legacy) uses of ListLike may implicitly depend on the fact that the domain of T does not include int (e.g., since int is a non-reference type) and thus may involve only reference instantiations, (e.g., since those may be the only instantiations previously allowed). Therefore compatibility may require that reference instantiations have both of these methods, but may require nothing regarding non-reference instantiations (e.g., since none may traditionally exist).

However, expanding the domain of genericity may, in some embodiments, enable potential conflicts between primitive and reference types, such as between replace(int) and replace(T) to be handled within an expanded domain of genericity. For example, the above ListLike example code is perfectly fine with the assumption that T represents a reference type, but when generics are extended so that T may take on a value or primitive type (e.g., int), this may become problematic as there may no way to distinguish the two remove methods. For example, with a body of code that depends on ListLike<T> for reference T, neither of the remove methods in the above example may be removed or renamed without breaking compatibility.

However, in some embodiments, peeling may allow the example ListLike class to be rewritten as shown in FIG. 4 and as in the following example code:

```
interface ListLike<T> {
    // generic layer
    public void remove (T element);
    public void removeAt(int index);
    // Object layer
    <where T extends Object>
    public void remove(int index);
    <where T extends Object>
    public void removeAt(int index) { remove(index);
    }
}
```

The subdivided version of ListLike may include one or more indicators that indicate which members are fully generic and which do not support the expanded genericity of the subdivided version of ListLike. Any of various methods may be utilized for indicating that methods (and/or other members of the class) are generic over all types, and that they are included in the generic layer 430, according to various embodiments. In some embodiments, methods (or method declarations) in the fully generic layer 430 may be annotated (e.g., using any of various adornments) to indicate that they are generic over all types, not just reference types. In one embodiment, the method declarations may be adorned with one or more special tokens, symbols and/or keywords, while in other embodiments, particular metadata (e.g., within or separate from the actual method declaration) may indicate that the particular method declaration is generic over all types. In another embodiment, additional attributes and/or metadata may be added to the class indicating which methods are fully generic.

Additionally, in some embodiments, the subdivided class 420 may include indicators that identify class members that are in a layer corresponding to the previous domain of genericity. As noted above, any of various methods, manners and/or syntax may be utilized for indicating that methods (and/or other members of the class) are generic only within the previous (restricted) domain of genericity, and that they are included in the object layer 440, according to various embodiments. For example, in some embodiments, methods (or method declarations) in the object layer 440 may be annotated (e.g., using any of various adornments) to indicate that they are generic just to reference types. In one embodiment, the method declarations may be adorned with one or more special tokens, symbols and/or keywords, while in other embodiments, particular metadata (e.g., with within or separate from the actual method declaration) may indicate that the particular method declaration is generic only within the previous (restricted) domain of genericity. In another embodiment, additional attributes and/or metadata may be added to the class indicating which methods are generic only within the previous domain of genericity.

In yet other embodiments, indicators may be added to identify members in one layer only (e.g., members in other layers may be identified as those members not in the indicated layer). Additionally, different types of indicators and/or syntax may be used in different embodiments and to indicate different type of members within the same class.

In some embodiments, the subdivided version of a class may include a generic layer that includes abstract versions of one or more of the members of the class and a layer corresponding to the previous domain of genericity that includes a non-abstract version of at least one of the class members that are abstract in the generic layer. The generic layer 430 may include abstract methods, such as remove (T) and removeAt(int). In some embodiments, newly specialized classes for T=int may have no problem with these abstract methods. The reference-specific (e.g., object) layer 440 may also include (or add) abstract methods, such as the example remove (int), as well as concrete implementations of one or more methods from the generic layer, such as the remoteAt(int) method. In some embodiments, existing code that uses ListLike<T> where T extends Object may see the familiar remove(Object) and remove(int) methods, thereby providing compatibility. In other words, existing class files will find the methods they look for (e.g., binary compatibility) and existing clients and implementations can be recompiled against the updated library with no ill effects (e.g., source compatibility). Additionally, specializations of ListLike<T> for non-reference types, such as int, may see the non-problematic pair of methods remove (T) and removeAt(int).

Existing implementations (e.g., not supporting an expanded domain of genericity) may expect remove(T) and remove(int) to be present and may expect them to be abstract, while expecting not to see new abstract methods (e.g., whose existence may cause a compiler error). By including both the declaration of remove(int) and the implementation of removeAt(int) in the reference layer, compatibility with existing implementation may be preserved, according to one example embodiment. In other words, reference instantiations may have remove(T) and remove (int), as well as the new removeAt(int), thereby possibly ensuring compatibility, while specializations may have the (nonproblematic) overloads of remove(T) and removeAt (int). Thus, existing implementations of ListLike may continue to compile (even though they do not support the expanded domain of genericity) since the new method removeAt(int) has a default for reference specializations, according to some embodiments. For primitive specializations however, removeAt may be seen as abstract and may need to be provided, but remove may not exist at all, according to some embodiments.

The methods (or other class members) included in the object layer 440 (e.g., those that are generic over reference types only) may, in some embodiments, be considered as both abstract and not abstract. For instance, using the ListLike example above, some methods (e.g., remove in the above example) may be implemented if T is a reference, but may not be implemented if T is a value.

In some embodiments, virtualized runtime environment 140 may be configured to load, instantiate and/or specialize subdivided (e.g., multi-layer or peeled) generic classes. For example, in some embodiment virtualized runtime environment 140 may be configured to load and/or instantiate a fully generic version (e.g., a version of the generic class instantiated for a non-reference type) of a subdivided generic class. Similarly, in another embodiment, virtualized runtime environment 140 may be configured to load and/or instantiate a version of the same subdivided generic class corresponding to the previous domain of genericity (e.g., a version of the generic class instantiated for a reference type). Thus, according to various embodiments, virtualized runtime environment 140 may be configured to load and/or instantiate both fully generic and less than fully generic versions of a subdivided generic class.

Figure 5:
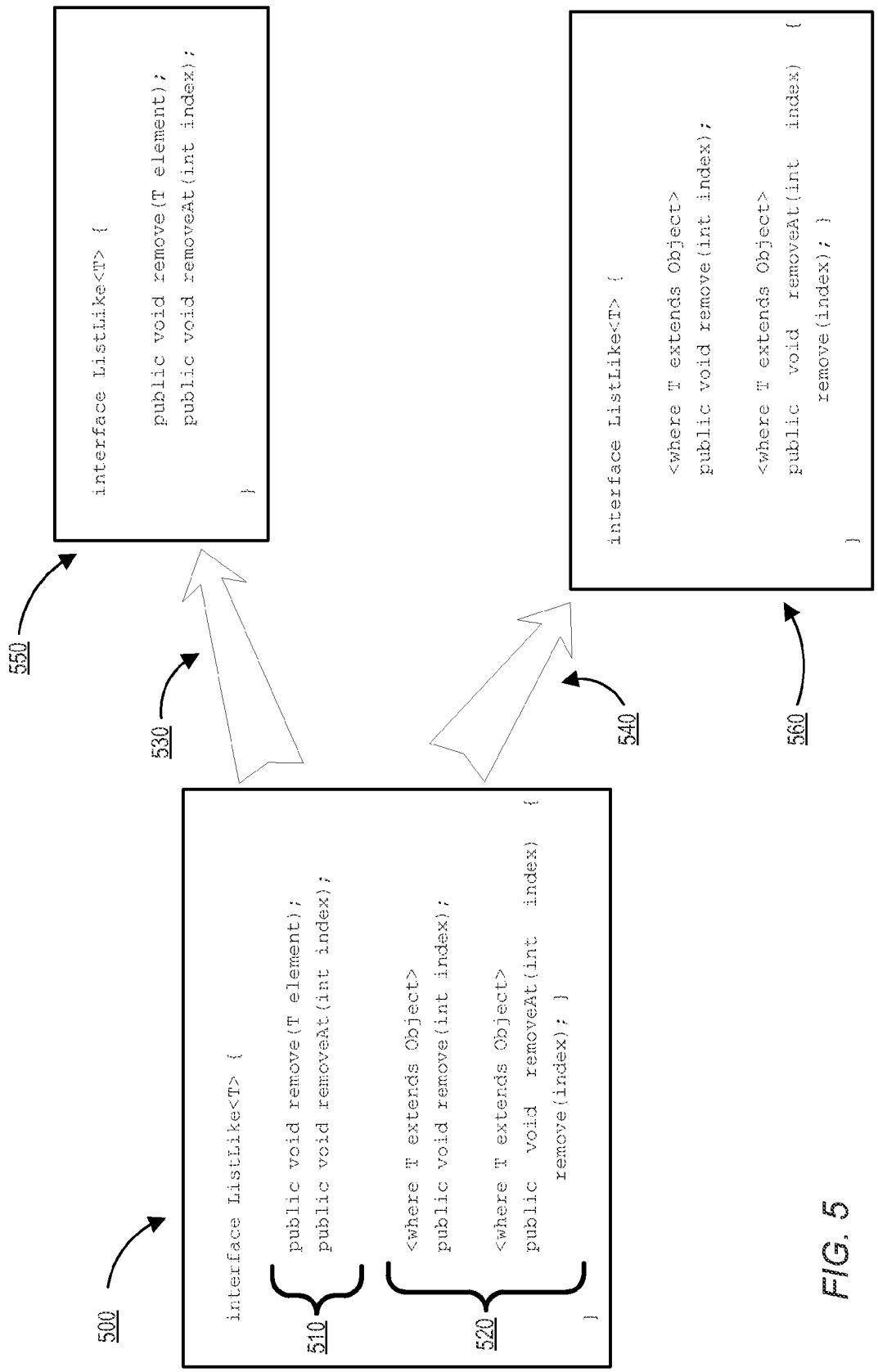
FIG. 5 is a logical block diagram illustrating the instantiation of classes based on a subdivided generic class, as in one embodiment.

FIG. 5 is a logical block diagram illustrating the instantiation of classes based on a subdivided generic class, as in one embodiment. When a subdivided (e.g., multi-layered) generic class, such as subdivided class 500, is loaded, the runtime environment (e.g., the VM in a Java-based system) may analyze the class to determine which methods (or other members) are restricted to particular parameterizations and may ignore those methods that are not applicable to the particular instantiation, according to some embodiments. As noted above a subdivided class file may include indicators (e.g., attributes, adornments, metadata, etc.) that may identify particular class members that are restricted to particular parameterizations (or that are fully generic) and the class loader may utilize those indicators to determine which class members to use and which to (possibly) ignore.

Thus, when subdivided class 500 is loaded and/or instantiated as a fully generic version of the class (e.g., instantiated for a non-reference type), as indicated by arrow 530, the class loader may generate a fully generic version of the class that includes those class members from the generic layer 510 and may not include those class members from the object layer 520 (e.g., indicated as not supporting the particular expanded genericity), as shown in fully generic class declaration 550, as in one embodiment.

Additionally, when subdivided class 500 is loaded and/or instantiated as a version of the class not supporting the expanded domain of genericity (e.g., instantiated for a referenced types), as indicated by arrow 540, the class loader may generate a reference-specific version of the class, as shown by reference-specific class declaration 560 that includes those class members from the object layer 520, while not including class members from the generic layer, as shown in reference-specific class declaration 560, according to one embodiment. Note that while FIG. 5 illustrates, and is described in terms of, an embodiment using a previous domain of genericity that corresponds to a reference-only domain of genericity, in other embodiments, different types (and or sets of types) may be included in any of various domains of genericity (and therefore in different layers of a subdivided generic class).

Figure 6:
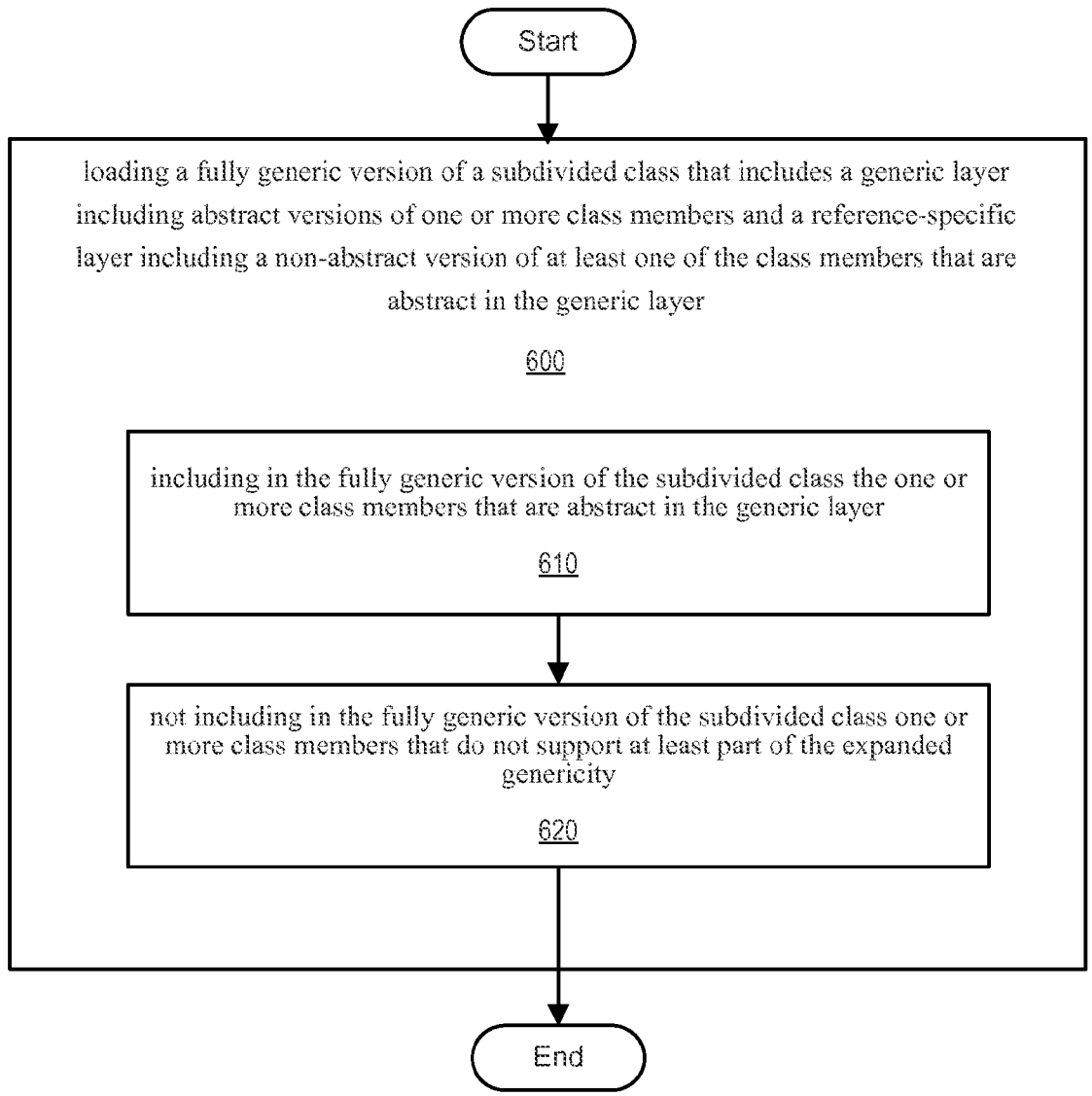
FIG. 6 is a flowchart illustrating one embodiment of a method for loading a fully generic version of a subdivided generic class, according to one embodiment.

FIG. 6 is a flowchart illustrating one embodiment of a method for loading (and/or instantiating) a fully generic version of a subdivided generic class, according to one embodiment. As shown in block 600, a class loader (or other component of a runtime environment) may load a fully generic version of a subdivided class that includes a generic layer including abstract versions of one or more class members and a reference-specific layer including a non-abstract version of at least one of the class members that are abstract in the generic layer, according to some embodiments.

For example, as described above regarding FIG. 5, a class loader may load a class based on the subdivided class 500. Subdivided class 500 may include a generic layer 510 and an object or reference-specific layer 520. In some embodiments, a method for loading a fully generic version of the class (e.g., a version of the class for a non-reference type) may involve including in the fully generic version of the subdivided class the one or more class members that are abstract in the generic layer, as shown in block 610. For example, a fully generic version of subdivided class 500 may include the class members, remove(T) and removeAt (int) from the generic layer 510, as illustrated in fully generic class declaration 550.

A method for loading a fully generic version of the class (e.g., a version of the class for a non-reference type) may also involve not including in the fully generic version of the subdivided class one or more class members that do not support at least part of the expanded genericity, as shown in block 620. For example, fully generic class declaration 550 may not include the class members from the object layer 520, which may not support genericity over non-reference types, as described above. In some embodiments, class members included in the object layer (e.g., those that are generic over reference types only) may be considered as both abstract and not abstract. Thus, some methods (e.g., remove in the ListLike example above) may be implemented if T is a reference, but may not be implemented if T is a value, according to some embodiments. Note that while FIG. 6 illustrates, and is described in terms of, an embodiment using a previous domain of genericity that corresponds to a reference-only domain of genericity, in other embodiments, different types (and or sets of types) may be included in any of various domains of genericity (and therefore in different layers of a subdivided generic class).

Figure 7:
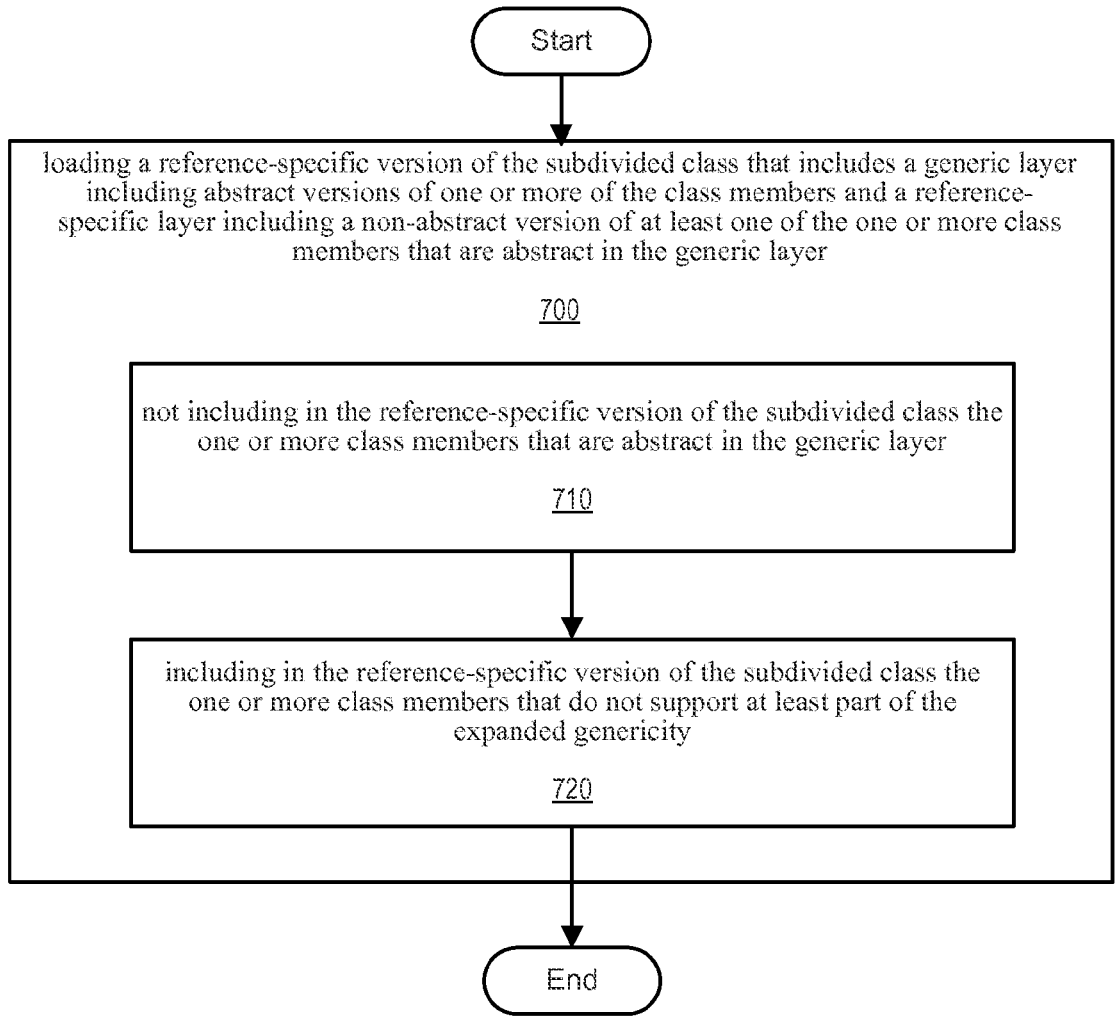
FIG. 7 is a flowchart illustrating one embodiment of a method for loading a reference-specific version of a subdivided generic class, according to one embodiment.

FIG. 7 is a flowchart illustrating one embodiment of a method for loading (and/or instantiating) a version of a subdivided generic class corresponding to a previous domain of genericity and that does not support an expanded genericity domain, according to one embodiment. As shown in block 700, a class loader (or other component of a runtime environment) may load a reference-specific version of a subdivided class, as in one example embodiment. As noted above, existing implementations of a class (e.g., not supporting an expanded domain of genericity) may expect certain methods to be present and may expect them to be abstract, while expecting not to see new abstract methods (e.g., whose existence may cause a compiler error). Thus, as with loading a fully generic version of a class, described above regarding FIG. 6, the subdivided class may include a generic layer including abstract versions of one or more class members and a reference-specific layer including a non-abstract version of at least one of the class members that are abstract in the generic layer, according to some embodiments.

As shown in block 710, a method for loading a reference-specific version of a subdivided class may involve not including in the reference-specific version of the subdivided class the one or more class members that are abstract in the generic layer, according to some embodiments. For example, as illustrated in reference-specific class declaration 560, a reference-specific version of the class may not include the abstract members from the generic layer 510 (e.g., reference-specific class declaration 560 does not include the abstract method remove(T) from the generic layer). The method for loading a reference-specific version of the subdivided class may also involve including in the reference specific version of the subdivided class the class members that do not support at least part of the expanded genericity, as shown in block 720. For example, as illustrated in reference-specific class declaration 560, a reference-specific version of a class may include those class members from the object layer 520, which (being reference-specific) do not support the expanded genericity (e.g., they don't support genericity over non-reference types).

Note that while FIG. 7 illustrates, and is described in terms of, an embodiment using a previous domain of genericity that corresponds to a reference-only domain of genericity, in other embodiments, different types (and or sets of types) may be included in any of various domains of genericity (and therefore in different layers of a subdivided generic class).

The multiple layers of a subdivided class may also be utilized when specializing a class. For instance, when a subdivided class is specialized, the specializer may use the class file as input to produce a new class file, transforming each method (or other class members) of the input class file into a corresponding method (or other member) of the new class file. However, in some embodiments, the specializer may not include certain methods/members (in the new class file) that are not applicable for the particular specialization being performed. As with the class loader, the specializer may utilize any of various types of indicators to determine which class members to specialize and which to not include in the new class file.

Figure 8:
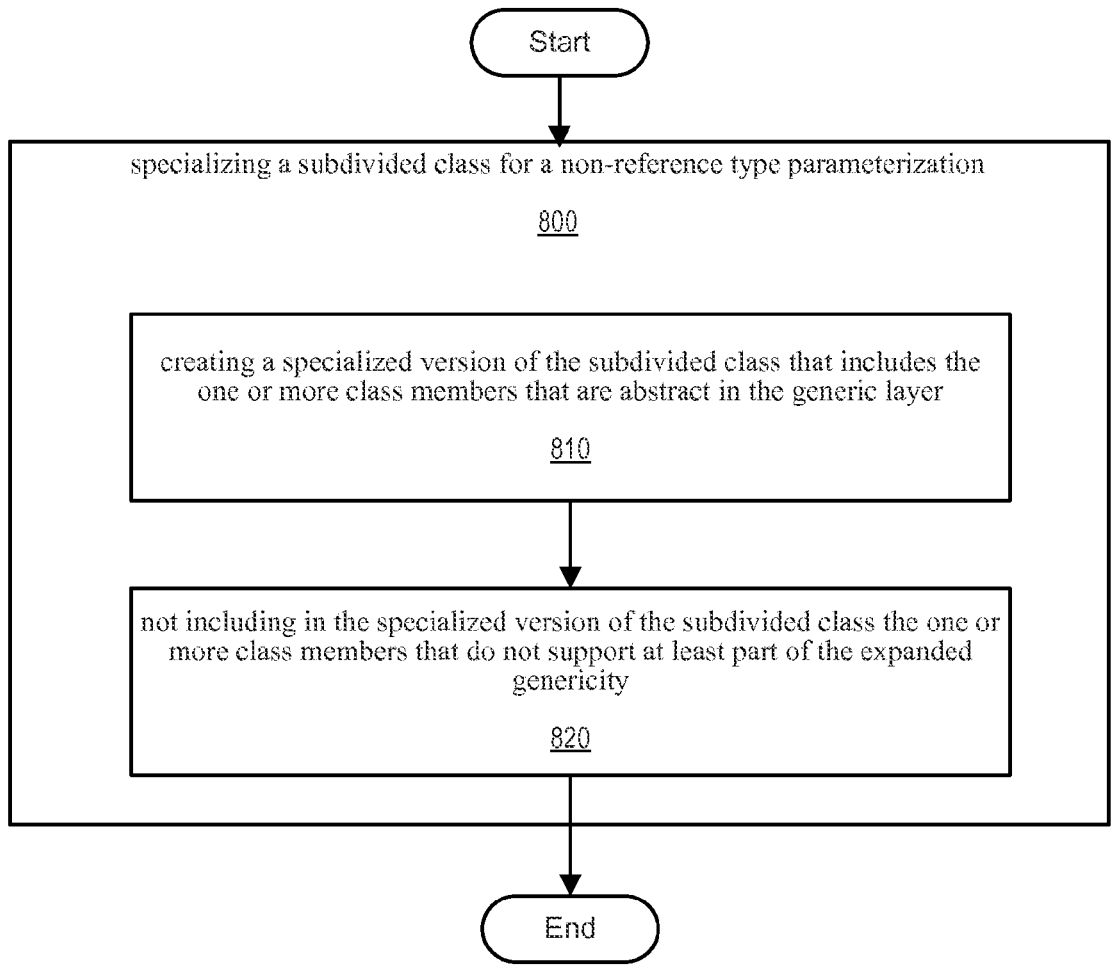
FIG. 8 is a flowchart illustrating one embodiment of a method for specializing a subdivided generic class for a non-reference type parameterization, according to one embodiment.

FIG. 8 is a flowchart illustrating one embodiment of a method for specializing a subdivided generic class for a non-reference type parameterization, according to one embodiment. As shown in block 800 a method for specializing a subdivided generic class for a non-reference type parametrization may include creating a specialized version of the subdivided class that includes one or more class members that are abstract in the generic layer, as shown in block 810 while not including one or more class members that do not support at least part of the expanded genericity as shown in block 820.

For example, a specialization of subdivided class 500 for a non-reference type (e.g., int) may involve the creation of a specialized version of the class that includes abstract members from generic layer 510, such as remove(T), but may not include reference-specific members from object layer 520, which may not support specialization over non-reference types.

Furthermore, certain classes may, in some embodiments, have methods whose signatures "incorrectly" incorporate assumptions about a previous domain of genericity. For example, while a natural declaration for a method that removes objects equal to a given object from a collection might be remove(T), developers often code such a method declaration as remove(object) which is harmless when the implicit domain of genericity corresponds to T extends Object (e.g., a reference-only domain of genericity), but may become problematic when the domain of genericity is expanded. For instance, a Collection class may have a remove(T) method which may be declared as remove(Object), but when the class is specialized, these methods may need to be specialized too (e.g., the argument type of Collection.remove is Object, not T). Thus, in some embodiments, an annotation (or other indicator) may be used to indicate that the method should be specialized as if this type parameter were declared as T, according to some embodiments. Different forms of annotations may be used in different embodiments. For instance, an annotation of the form, @SpecializeAsFullyGeneric, may be used in some embodiments.

Additionally, decomposing a generic class into multiple layers may also be applied to possibly eliminate problems with null-able results for certain types. For instance, null may be considered a valid value of every reference type, and may therefore be used to represent the fact that nothing is located at the location being referenced or that the reference does not refer to any location. Primitive and value types, however, may have no analogue of null. This may be considered a challenge for certain methods, such as methods defined to return null. For example, in one embodiment, a method Map.get may be defined to return null if a specified key cannot be found in the map.

Certain operations with null (e.g., assignments to null and comparisons with null) may be assigned particular semantics, according to some embodiments. For example, in some embodiments, an assignment to null may be treated as an assignment to the zero value. Zero may be considered the value to which uninitialized fields and array elements are set (e.g., zero for numeric types, false for boolean, etc.). Similarly, in some embodiments, a comparison to null may be considered a comparison to the zero value. However, in other embodiments, this treatment may introduce ambiguities where it may not be possible to distinguish between no value (e.g., a reference to null) and a value equal to zero (e.g., an uninitialized numeric or Boolean type). Similarly using the traditional behavior of Map.get a return value of null could mean "no mapping" or could mean "mapped to null." Alternatively, certain usages of null may be forbidden in some embodiments, which may negatively impact certain uses (e.g., specializability) of some classes, such as the HashMap class in Java.

In some embodiments, decomposing a generic class into multiple layers may be utilized to potentially eliminate problems with null-able results with primitive types (or other types that do not support an expanded domain of genericity). For example, Map.get may be moved into a reference-specific layer (e.g., for specialization) and primitive instantiations may be use a getOrDefault method (e.g., in a fully generic layer). For example:

```
interface Map<K,V> {
    // generic layer
    public V getOrDefault(K key, V defaultValue);
    // Object layer
    <where V extends Object>
    public default V getOrDefault(K key, V defaultValue) {
        return containsKey(key) ? get(key) :
            defaultValue;
    }
    <where V extends Object>
    public V get(K key);
}
```

Similarly to the ListLike example above, the example class Map<K, V> may include multiple layers, such as a fully generic layer and a layer corresponding to the previous domain of genericity. The fully generic layer may include the abstract method getOrDefault(K key, V defaultValue). Newly specialized classes for value types may, in some embodiments, have no problem with this abstract method. The layer corresponding to the previous domain of genericity may include (or add) abstract methods, such as the example getK key), as well as concrete implementations of methods from the generic layer, such as the getOrDefault (K key, V defaultValue) method.

When specializing the above example Map class for a non-reference type, the specializer may generate a Map class by including the abstract methods from the generic layer, while not including the methods from the object layer, as described above. Alternatively, when specializing the above example Map class for a non-reference type, the specializer may generate a Map class by including the methods from the object layer while not including (e.g., ignoring) the abstract methods from the generic layer, according to some embodiments.

Thus, in some embodiments, existing clients of Map<K, V> where T extends Object may see the remove(Object) and remove(int) methods (e.g., when Map is specialized for a reference type), thereby possibly preserving binary compatibility, while specializations of ListLike<T> for non-reference types, such as int, may see the non-problematic pair of methods remove (T) and removeAt(int).

Figure 9:
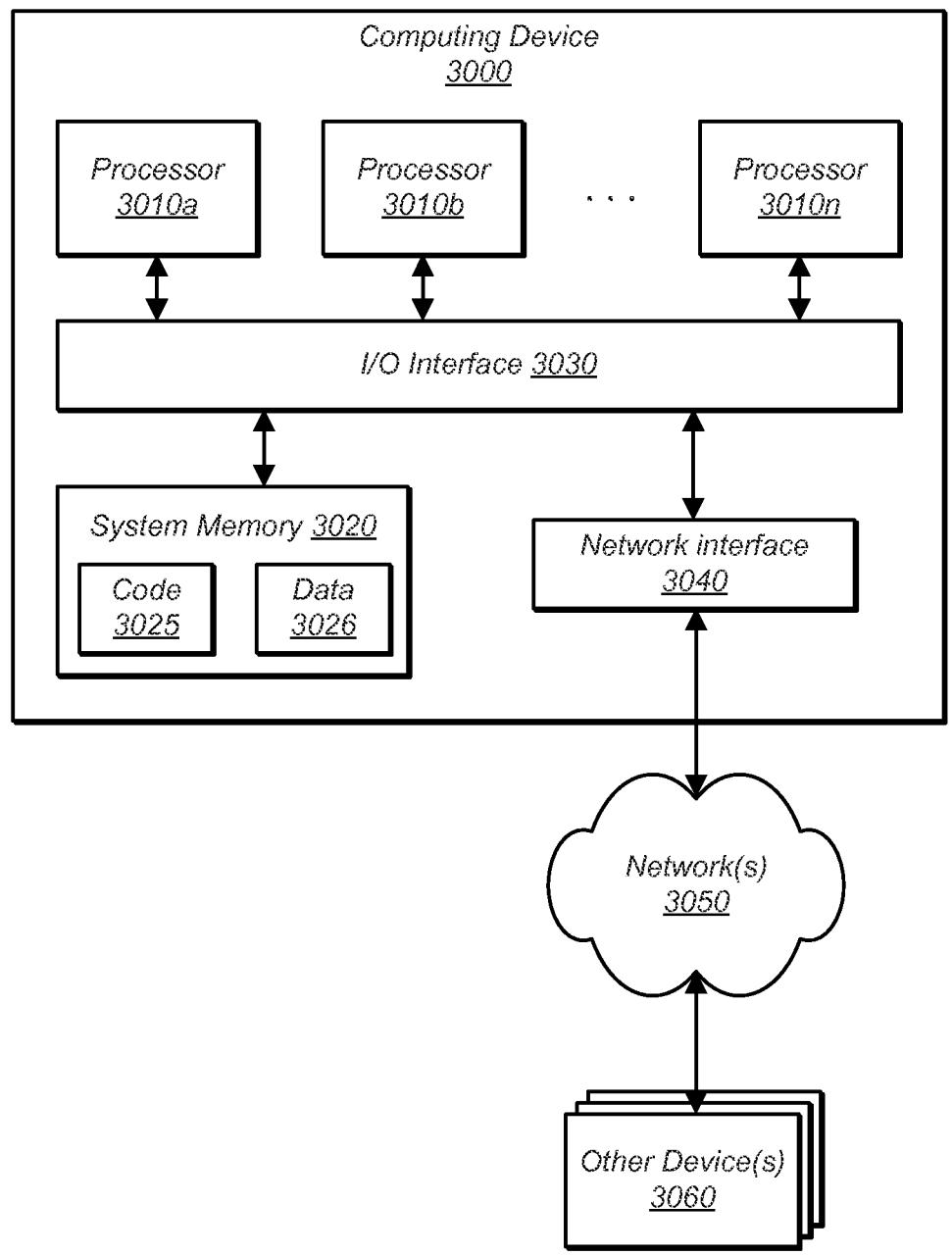
FIG. 9 is a logical block diagram illustrating an example computer system suitable for implementing decomposing a generic class into layers, according to one embodiment.

In at least some embodiments, a computer system that implements a portion or all of one or more of the technologies described herein may include a general-purpose computer system that includes or is configured to access one or more computer-readable media. FIG. 9 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing compiler 120 and/or virtualized runtime environment 140, described above.

In various embodiments, compiler 120 and/or virtualized runtime environment 140 (and/or any individual sub-modules thereof) may each be implemented in any of various programming languages or methods. For example, in one embodiment, compiler 120 and/or virtualized runtime environment 140 may be written in any of the C, C++, assembly, JAVA or other general purpose programming languages, while in another embodiment, one or more of them may be written using a different, more specialized, programming language. Moreover, in some embodiments, compiler 120 and/or virtualized runtime environment 140 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIGS. 1-8 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by compiler 120 may, in some embodiments, be performed by virtualized runtime environment 140 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to perform:
   expanding a domain of genericity of an existing generic class comprising a plurality of class members, wherein one or more of the plurality of class members do not support at least part of the expanded domain of genericity, wherein the domain of genericity comprises a range of types over which the generic class is eligible for specialization, wherein for the expanded domain of genericity the range of types includes one or more reference types and one or more non-reference types, wherein the one or more of the plurality of class members that do not support at least part of the expanded domain of genericity do not support specialization for the one or more non-reference types;

wherein said expanding comprises:

creating a subdivided version of the class that supports the expanded domain of genericity and preserves compatibility with the existing generic class, wherein creating the subdivided version of the class comprises:

including, in the subdivided version of the class, one or more indicators that identify one or more of the plurality of class members that support the expanded domain of genericity as part of a first layer of the subdivided version of the class, and the one or more of the plurality of class members that do not support at least part of the expanded domain of genericity as part of a second layer of the subdivided version of the class.

2. The non-transitory, computer-readable storage medium of claim 1, wherein the first layer is a generic layer including abstract versions of the one or more of the plurality of class members that support the expanded domain of genericity; and wherein the second layer is a reference-specific layer including a non-abstract version of at least one of the one or more of the plurality of class members for which abstract versions are included in the generic layer.

3. The non-transitory, computer-readable storage medium of claim 2, wherein the program instruction further cause the computing device to perform loading a fully generic version of the subdivided class, wherein said loading comprises:

including in the fully generic version of the subdivided class the one or more of the plurality of class members for which abstract versions are included in the generic layer; and not including in the fully generic version of the subdivided class the one or more of the plurality of class members that do not support at least part of the expanded domain of genericity.

4. The non-transitory, computer-readable storage medium of claim 2, wherein the program instruction further cause the computing device to perform loading a reference-specific version of the subdivided class, wherein said loading comprises:

not including in the reference-specific version of the subdivided class the one or more of the plurality of class members for which abstract versions are included in the generic layer; and including in the reference-specific version of the subdivided class the one or more of the plurality of class members that do not support at least part of the expanded domain of genericity.

5. The non-transitory, computer-readable storage medium of claim 2, wherein the program instructions further cause the computing device to perform specializing the subdivided class for a non-reference type parameterization, wherein said specializing comprises:

creating a specialized version of the subdivided class that includes the one or more of the plurality of class members for which abstract version are included in the generic layer; and not including in the specialized version of the subdivided class the one or more of the plurality of class members that do not support at least part of the expanded domain of genericity.

6. The non-transitory, computer-readable storage medium of claim 1, wherein the plurality of class members includes one or more of: a method, a field, a constructor, or a nested type.

7. A method implemented with a computing system having at least one processor coupled with memory-stored executable instructions which, when executed by the processor, cause the processor to perform the method, comprising:

expanding, by a compiler or a platform independent, object oriented runtime environment implemented on one or more computing devices, a domain of genericity of an existing generic class comprising a plurality of class members, wherein one or more of the plurality of class members do not support at least part of the expanded domain of genericity, wherein the domain of genericity comprises a range of types over which the generic class is eligible for specialization, wherein for the expanded domain of genericity the range of types includes one or more reference types and one or more non-reference types, wherein the one or more of the plurality of class members that do not support at least part of the expanded domain of genericity do not support specialization for the one or more non-reference types;

wherein said expanding comprises:

creating, by the compiler or the platform independent, object oriented runtime environment, a subdivided version of the class that supports the expanded domain of genericity and preserves compatibility with the existing generic class, wherein creating the subdivided version of the class comprises:

including, by the compiler or the platform independent, object oriented runtime environment, in the subdivided version of the class, one or more indicators that identify one or more of the plurality of class members that support the expanded domain of genericity as part of a first layer of the subdivided version of the class, and the one or more of the plurality of class members that do not support at least part of the expanded domain of genericity as part of a second layer of the subdivided version of the class.

8. The method of claim 7, wherein the first layer is a generic layer including abstract versions of the one or more of the plurality of class members that support the expanded domain of genericity; and wherein the second layer is a reference-specific layer including a non-abstract version of at least one of the one or more of the plurality of class members for which abstract versions are included in the generic layer.

9. The method of claim 8, further comprising loading, by the platform independent, object oriented runtime environment, a fully generic version of the subdivided class, wherein said loading comprises:

including, by the platform independent, object oriented runtime environment, in the fully generic version of the subdivided class the one or more of the plurality of class members for which abstract versions are included in the generic layer; and not including, by the platform independent, object oriented runtime environment, in the fully generic version of the subdivided class the one or more of the plurality of class members that do not support at least part of the expanded domain of genericity.

10. The method of claim 8, further comprises loading, by the platform independent, object oriented runtime environment, a reference-specific version of the subdivided class, wherein said loading comprises:

not including, by the platform independent, object oriented runtime environment, in the reference-specific version of the subdivided class the one or more of the plurality of class members for which abstract versions are included in the generic layer; and including, by the platform independent, object oriented runtime environment, in the reference-specific version of the subdivided class the one or more of the plurality of class members that do not support at least part of the expanded domain of genericity.

11. The method of claim 8, further comprising specializing, by the platform independent, object oriented runtime environment, the subdivided class for a non-reference type parameterization, wherein said specializing comprises:

creating, by the platform independent, object oriented runtime environment, a specialized version of the subdivided class that includes the one or more of the plurality of class members for which abstract version are included in the generic layer; and not including, by the platform independent, object oriented runtime environment, in the specialized version of the subdivided class the one or more of the plurality of class members that do not support at least part of the expanded domain of genericity.

12. The method of claim 7, wherein the plurality of class members includes one or more of: a method, a field, a constructor, or a nested type.

13. The method of claim 7, wherein said compatibility comprises one or more of source compatibility, binary compatibility, or behavioral compatibility.

14. A computing device, comprising:
a processor; and
a memory comprising program instructions, that when executed on the processor cause the processor to:
expand a domain of genericity of an existing generic class comprising a plurality of class members, wherein one or more of the plurality of class members do not support at least part of the expanded domain of genericity, wherein the domain of genericity comprises a range of types over which the generic class is eligible for specialization, wherein for the expanded domain of genericity the range of types includes one or more reference types and one or more non-reference types, wherein the one or more of the plurality of class members that do not support at least part of the expanded domain of genericity do not support specialization for the one or more non-reference types;

wherein to expand the domain of genericity of the existing generic class the program instruction further cause the processor to:
create a subdivided version of the class that supports the expanded domain of genericity and preserves compatibility with the existing generic class, wherein to create the subdivided version of the class comprises:
include, in the subdivided version of the class, one or more indicators that identify one or more of the plurality of class members that support the expanded domain of genericity as part of a first layer of the subdivided version of the class and the one or more of the plurality of class members that do not support at least part of the expanded domain of genericity as part of a second layer of the subdivided version of the class.

15. The computing device of claim 14,
wherein the first layer is a generic layer including abstract versions of the one or more of the plurality of class members that support the expanded domain of genericity; and
wherein the second layer is a reference-specific layer including a non-abstract version of at least one of the one or more of the plurality of class members for which abstract versions are included in the generic layer.

16. The computing device of claim 15, wherein the program instruction further cause the processor to:
load a fully generic version of the subdivided class, wherein to load the fully generic version of the subdivided class, the program instruction further cause the processor to:
include in the fully generic version of the subdivided class the one or more of the plurality of class members for which abstract versions are included in the generic layer; and
not include in the fully generic version of the subdivided class the one or more of the plurality of class members that do not support at least part of the expanded domain of genericity.

17. The computing device of claim 15, wherein the program instructions further cause the processor to:
load a reference-specific version of the subdivided class, wherein to load the reference-specific version of the subdivided class, the program instruction further cause the processor to:
not include in the reference-specific version of the subdivided class the one or more of the plurality of class members for which abstract versions are included in the generic layer; and
include in the reference-specific version of the subdivided class the one or more of the plurality of class members that do not support at least part of the expanded domain of genericity.

18. The computing device of claim 15, wherein the program instructions further cause the processor to:
specialize the subdivided class for a non-reference type parameterization, wherein to specialize the subdivided class, the program instructions further cause the processor to:
create a specialized version of the subdivided class that includes the one or more of the plurality of class members for which abstract version are included in the generic layer; and
not include in the specialized version of the subdivided class the one or more of the plurality of class members that do not support at least part of the expanded domain of genericity.

19. The computing device of claim 14, wherein the plurality of class members include one or more of: a method, a field, a constructor, or a nested type.

20. The computing device of claim 14, wherein said compatibility comprises one or more of source compatibility, binary compatibility, or behavioral compatibility.

\* \* \* \* \*